April 6, 1937. R. J. MINNS 2,075,994
SUPPLY MEANS FOR TANKS AND OTHER RECEPTACLES
Filed Sept. 9, 1935
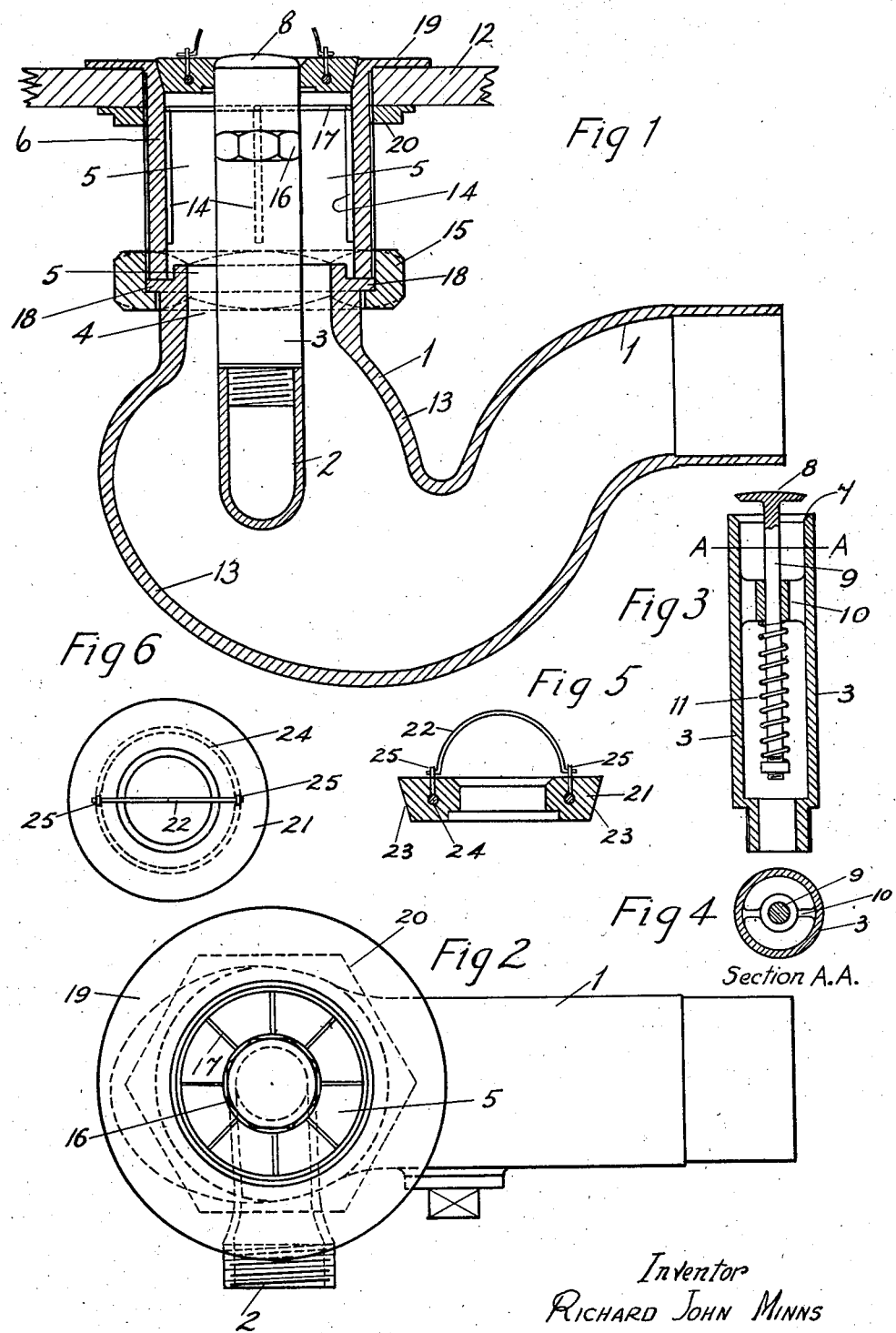
Inventor
Richard John Minns
By his Attorney
Emil Bönnelycke Patented Apr. 6, 1937

2,075,994

UNITED STATES PATENT OFFICE 2,075,994

SUPPLY MEANS FOR TANKS AND OTHER RECEPTACLES

Richard John Minns, Renhold, England

Application September 9, 1935, Serial No. 39,825
In Great Britain September 13, 1934

5 Claims. (Cl. 4—196)

This invention relates to the supply of liquids or fluids to baths, tanks, sinks, lavatory basins and other receptacles and the primary object is to provide a novel form of inlet means for the supply of one or more liquids such as hot and cold water or steam or other desired liquid or fluid to the receptacle by way of the same means or opening as that by which the waste liquid or fluid is carried off. In the case of domestic baths or lavatory basins in particular this has the advantage that the interior wall or base thereof is not stained or marked by the water running or dripping from the usual supply tap or taps whilst in all cases the invention simplifies and reduces the number of fittings required.

A further object is to provide an improved form of stopper or waste-plug particularly for use with the supply means above mentioned.

With the above objects in view therefore the invention, broadly stated, consists in supplying the liquid or fluid with which the bath, tank, basin or other receptacle is to be charged or filled, through the waste outlet, pipe, discharge fitting, or other attachment.

An example of the invention suitable for application to a domestic bath or lavatory-basin is illustrated in the accompanying drawing in which Fig. 1 is a vertical section of the complete fitting; Fig. 2 is a plan view of Fig. 1. Fig. 3 is a detail section of the supply tube and valve; Fig. 4 is a cross section on line A—A of Fig. 3, Fig. 5 is a cross section of the stopper or plug and Fig. 6 is a plan view thereof.

The usual form of waste trap fitting 1 may be used somewhat modified, if necessary as hereinafter explained, and into said fitting and shown at one side thereof I provide a threaded inlet or boss 2 for the liquid or fluid, with, in the case of supplies for hot and cold water suitable valves or taps with means for operating them from a convenient position. Into said threaded inlet boss is screwed the inner end of a supply tube 3 centered within the usual neck 4 of the trap and leaving around it an annular space 5 for the waste liquid or fluid. The other or outer end of the supply tube 3 extends substantially to the same plane as or flush with the top or outer end of the usual bush 6 fitted to the bottom of the bath and forming part of the waste-trap, this upper end being shaped to form an annular or circular seating 7 on to which fits a valve 8 preferably slightly convex in form as shown and having a stem 9 passing through a guide 10 in the supply tube and under the action of a spring 11 tending to normally hold the valve in closed condition. In operation the pressure of the liquid or fluid passing through the supply tube 3 will force the valve 8 open against the action of the spring 11 and cause said liquid or fluid to enter the bath or other receptacle at the seating 7 in the form of a spray of circular formation, this in the case of domestic baths or basins, taking place practically at or just above the level of the bottom 12 of said bath where in the ordinary way the waste liquid is discharged. Thus no drips or running liquid impinges upon the wall or bottom 12 of the bath at any time and consequently no unsightly marking or staining of these parts can take place.

In Fig. 1 the upper end of the trap fitting 1 is shown as flanged at 18 to form a seating for the bush 6 the connection being made by the lock nut 15 and the bush is provided at its upper end with a flange 19 to fit against the bottom 12 of the receptacle against which it is locked by another lock-nut 20.

I may, if necessary, modify the waste-trap by bulging or enlarging it outwards at or around the inlet supply tube as shown at 13 so as not to unduly restrict the passage for waste liquid and I propose also to provide the aforesaid trap-bush 6 with a number of interior lugs 14 for engagement by a holding or turning implement so that the bush and its check or lock-nut 15 can be more readily inserted and removed when required. The supply tube 3 is also preferably squared, or hexagoned or the like as at 16 to receive a box-spanner or other tool by which it can be easily screwed into the inlet boss or fitment 2 or removed at will. A spider or grating 17 may be inserted resting on the lugs 14 to control or prevent passage of large matter into the trap.

It will be apparent from the above description that a supply of clean liquid or liquids or fluids such as steam, the latter for instance being used as a calorifier for cold liquid, may be arranged to enter the body of the trap at any position or angle which may be most desirable for the particular structure or purpose for which the supply is to be used and will be discharged into the receptacle at the part where the waste liquid or fluid is also drawn off.

The stopper or plug before mentioned and shown in Figs. 5 and 6 is in the form of a ring or annulus 21 of rubber or similar or desired material adapted to fit round the feed tube 3 and provided with a handle or bail 22 on its upper side for manipulating it. The ring may be conveniently chamfered or tapered on its outside as at 23 to fit the waste bush 3 and is re-inforced with a ring of metal 24 firmly moulded or embedded in the rubber and provided with lugs 25 in which the handle or bail 22 is pivoted. In use, the plug is first inserted, then the liquid or fluid with which the receptacle to be charged is turned on and when the supply pressure is relieved the valve 8 of the supply means closes the central supply tube 3 and the waste is closed, the said valve preventing contaminated liquid or fluid entering the said supply tube.

I declare that what I claim is:—

1. In supply means for tanks and other receptacles, the combination of a waste trap, an inlet for fluid thereto, a feed-pipe removably fitted into said inlet leaving an annular outlet space for waste fluid around same and the inner wall of the trap, and a normally closed valve applied to said feed-pipe lying flush with the inner surface of the receptacle, said valve being adapted to be opened by the pressure of fluid in said feed pipe and to automatically return to closed position on cessation of said pressure.

2. In supply means for tanks and other receptacles, the combination of a waste trap, an inlet for fluid thereto, a feed-pipe removably fitted into said inlet leaving an annular space for outlet of waste fluid around same and the inner wall of the trap, a normally closed valve applied to said feed-pipe lying flush with the inner surface of the receptacle, said valve being adapted to be opened by the pressure of fluid in said feed-pipe and to automatically return to closed position on cessation of said pressure, and a removable plug adapted for closure of the annular space aforesaid.

3. In supply means for tanks and other receptacles, the combination of a waste trap, an inlet for fluid thereto, a feed-pipe screwed into said inlet having a seating at its outer end and providing an annular space for waste fluid between same and the inner wall of the trap, a valve applied to said seating and lying normally flush with the inner surface of the receptacle, said valve being adapted to be opened by the pressure of fluid in said feed-pipe and a spring adapted to close said valve on its seat on cessation of said fluid pressure.

4. In supply means for tanks and other receptacles, the combination of a waste trap, an inlet for fluid thereto, a feed-pipe removably inserted into said inlet having a seating at its outer end and providing an annular space for waste fluid between same and the inner wall of the trap, a spring-loaded valve applied to said seating and lying normally closed flush with the inner surface of the receptacle, said valve being adapted to be opened by the pressure of the fluid in said feed-pipe, and a removable annular plug adapted to surround the outer end of the feed-pipe and close the annular waste space aforesaid.

5. In supply means for tanks and other receptacles, the combination of a waste trap, having an inlet for fluid thereto, a removable feed-pipe screwed into said inlet and centered within the body of the trap to provide an annular space for waste fluid between itself and the inner wall of the trap, a valve seating at the outer end of the feed-pipe flush with the inner surface of the receptacle, a spring-loaded valve having movement within the feed-pipe and normally closing said valve, the latter being adapted to be opened by fluid pressure in the feed-pipe against the spring load of said valve and a removable annular plug adapted to surround the feed-pipe at the level of the inner surface of the receptacle to close the annular waste space aforesaid substantially as described.

RICHARD JOHN MINNS.